April 10, 1945.   E. L. CAMFIELD   2,373,537
VALVE MECHANISM FOR STEAM ENGINES
Filed Oct. 16, 1943
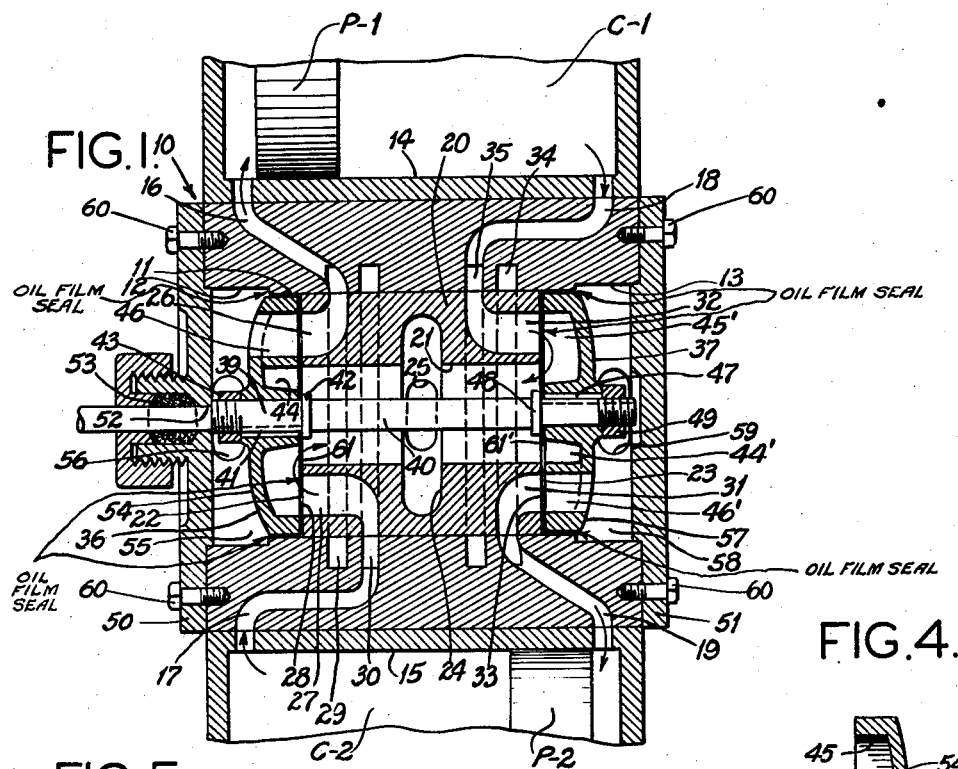
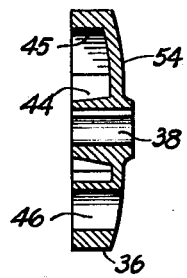
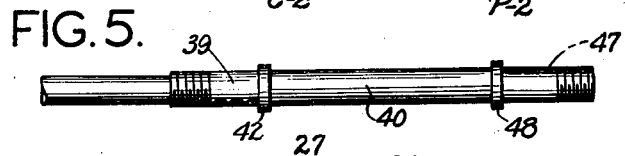
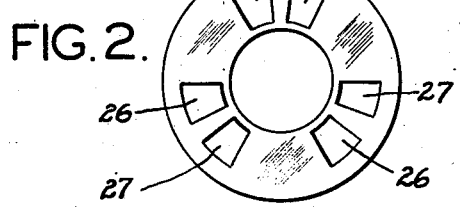
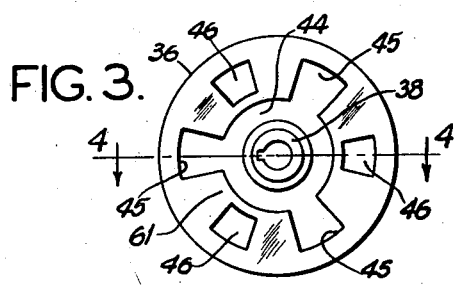
INVENTOR:
EMERY L. CAMFIELD
ATTORNEY Patented Apr. 10, 1945

2,373,537

UNITED STATES PATENT OFFICE 2,373,537

VALVE MECHANISM FOR STEAM ENGINES

Emery L. Camfield, St. Louis, Mo.

Application October 16, 1943, Serial No. 506,605

2 Claims. (Cl. 121—122)

This invention relates to improvements in valve mechanism for steam engines and the like, and more particularly to an improved engine valve assembly of a rotary, balanced character.

The present application relates to certain important improvements over U. S. Patent No. 1,304,155, now expired, issued to this applicant May 20, 1919, and entitled Engine valve. The present application is in part a continuation of application Serial No. 462,656, filed October 19, 1942, entitled Engine valves. Serial No. 462,656 is now expressly abandoned as an application, but without any abandonment of the invention.

An object of the invention resides in the provision of a novel and efficient engine valve of rotary type, embodying opposed rotary valve elements in an arrangement affording inherent and permanent operational balance of these elements.

Another object of the invention is to provide an engine valve assembly of the character indicated, having a ported valve seat member disposed centrally within a valve chest or casing, and opposed, relatively angularly related disc-valves rigidly secured upon a common drive shaft extending longitudinally into the valve chest, the assembly and operational arrangement of these parts being such as to avoid or at least minimize frictional engagement of each valve with the co-acting valve seat member and with adjacent wall portions of the valve chest, to avoid any tendency to squeeze out lubricant from between the valve and valve seat, and to effect substantially a floating relation of the opposed rotary valves with respect to the valve seat member.

A further important object is to minimize, in fact substantially to obviate, the power loss incident in prevailing valve assemblies to the friction resulting from the intimate and close fit of valve to seat, subjected as they are, to full steam pressure in a valve-seating direction.

A further object is to provide an improved valve of rotary disc type, embodying a valve seat-forming member formed as a separate element, and press-fit or otherwise fixedly seated centrally within the valve chest or casing for coaction with the disc-valves, the valve seat member being a separately formed part of the mechanism, thus permitting full access thereto prior to assembly, for machining, routing of ports and passages in the member, and finishing of the valve seat surfaces thereof.

An additional object is attained in a valve assembly which when utilized with a rotary valve gear, may operate as a "slow acting" valve, being usually timed in a 1:3 ratio to the engine crank or power shaft, and which thereby conduces to a low power consumption for valve actuation, a low rate of wear of valve parts, and permanency of timing.

A still further object is to provide an engine valve of the character indicated, wherein the fixed or stationary valve-seat member and the rotary disc-valves coacting with the opposite ends of the seat member, are disposed wholly within the valve chest or casing, with each disc-valve appreciably inset or spaced inwardly from the adjacent head of the valve chest, to define therebetween a steam supply chamber, and wherein the valve seat member provides an exhaust chamber axially thereof, common to the disc-valves, the improved valve in assembly, affording an efficient, compact and relatively light-weight valve device. The inset arrangement of the disc-valves contributes materially to the compactness and space-saving features of the assembly, by permitting appreciable reduction in the longitudinal or axial dimension of the valve device.

Yet another object is to provide an engine valve of this character which can be readily and easily reversed while subject to maximum steam pressure, the improved valve further being characterized by a non-stick and non-binding rotary valve assembly, attained principally by reason of the balanced and floating arrangement of the opposed disc-valve elements.

Additional objects and advantages afforded by the present improvements, will appear from the following description of a preferred embodiment of the invention, as exemplified in the accompanying drawing, wherein:

Fig. 1 is a sectional elevation longitudinally of the valve assembly showing also, in diagram, fragmentary portions of the associated engine cylinders;

Fig. 2 is a view in elevation, of one end of the valve-seat member;

Fig. 3 is a view in elevation of one of the rotary disc-valves, showing the admission and exhaust control ports therein;

Fig. 4 is an elevation in section transversely through a rotary disc-valve, as viewed from line 4—4 in Fig. 3, and Fig. 5 is a longitudinal view of the valve drive shaft.

Referring to the drawing by suitable characters of reference, the valve device according to the presently preferred embodiment thereof, includes a valve chest, steam chest or casing 10 formed to provide a cylindrical bore 11 longitudinally therethrough, open at each end as shown.

By preference, the bore 11 is somewhat enlarged at its opposite ends, as at 12 and 13, these enlarged portions constituting live steam chambers as will hereinafter more fully appear. In the present example, the valve device is adapted for operative association with a pair of engine cylinders, C—1 and C—2, in which operate pistons P—1 and P—2, there being formed in diametrically opposite wall portions 14 and 15 of the valve casing, passages 16—17 and 18—19 respectively, affording steam delivery and exhaust communication between the valve and the adjacent engine cylinders, each of these passages opening to the central zone of the valve bore 11, as indicated.

A cylindrical member or block 20 constituting the stationary element of the valve proper, and which may be cast-cored, according to usual and well known practice, or may be machined from a suitable block, to provide the axial chambers and peripheral passages shown, is arranged centrally within the casing bore 11. The block being a separately formed element according to the present improvements, may be press-fit or otherwise suitably secured in the casing bore 11 such as to preclude longitudinal and rotary displacement of the member therein, once it is assembled to the casing. As appears from Figs. 1 and 2, the member provides an axial chamber 21 open at the block ends 22 and 23, and appreciably radially enlarged in its central zone, as at 24. The chamber 21—24 serves to receive exhaust steam during valve operation, for discharge as to an exhaust line or to a condenser (not shown) through a discharge passage 25 formed in the block and open to the chamber portion 24 and through a communicating passage (not shown) in the casing 10.

The valve member 20 which by reason of the axial chamber 21—24 therethrough, is of cylindrically tubular character, has formed in the tubular wall thereof in the block end zone 22, two sets of angulate passages 26 and 27. The passages 26, which are three in number according to the present example, are equally angularly spaced as indicated in Fig. 2, and terminate at one end in port openings in the planar block end face 28. The opposite ends of passages 26 open substantially radially of the block end section 22, and communicate with an annular recess or channel 29 in the casing bore 11, the channel 29 being in communication with and constituting an extension of the casing passage 16 (Fig. 1). The passages 27 comprising the second set and being three in number, are angularly spaced equally relative to each other, but bear an alternate relation to the passages 26 of the first set, such that each passage 27 is between, but preferably not equally spaced from the adjacent passages 26 (Fig. 2). Passages 27 similarly to passages 26 terminate in port openings in the block end face 28, and at their opposite ends open substantially radially of the block inwardly beyond the corresponding ends of passages 26, for communication with an annular recess or channel 30 in the casing bore 11. Channel 30 provides an extension of the casing passage 17 (Fig. 1), so that the passages 27 are open to casing passage 17 at all times.

Like groups of angulate passages 31 and 32 are provided in the tubular wall at the opposite end section 23 of the block 20, these being relatively angularly related as described for the passage groups 26 and 27. Passages 31 have port openings in the planar end face 33 of the block, and communicate with casing passage 19 through an annular channel 34 in the casing bore, while passages 32 also have port openings in the block end face 33 and communicate with casing passage 18 through an annular casing channel 35. While but one passage of each set 31 and 32 is shown in Fig. 1, it will appear therefrom, that as presently preferred, the passages 31 and 32 are shifted angularly relative to the corresponding passages 26 and 27, such that passages 26 and 32 are in substantial alignment longitudinally of the block 20, this resulting in similar longitudinal alignment of the passages 27 and 31.

As will now appear, formation of the block 20 as a separate element, for assembly by press fit or otherwise in the casing bore 11, is of decided advantage to simplicity and economy of valve manufacture, since it thus facilitates any desired machining, drilling or routing of the ports and passages therein, and finishing of the valve end surfaces 28 and 33 provided by the block.

Rotary valve elements 36 and 37 of an improved character are operatively associated with the block 20, being arranged respectively, adjacently to and so as to overlie the block end faces 28 and 33, whereby to control opening and closing of the ports in the block faces. These valve elements, each being in the nature of a valve disc or valve head according to the present example of the invention, are identical in form and construction, so that a description of one thereof, say, the valve 36 at the block face 28, will suffice for both.

The valve element 36 is of plate or disc form, having an axial hub section 38 for mounting upon one end 39 of a valve spindle or shaft 40, the latter extending longitudinally through the block bore or exhaust chamber 21—24 as shown. It is contemplated that the shaft 40 be rotated in timed relation to the engine by means (not shown) which may be conventional in character. Obviously, the improvements may be utilized in an oscillating valve gear assembly. The valve as shown is secured rigidly in its angular relation to the shaft, as by a suitable key 41, and is confined against displacement longitudinally of the shaft, by an integral shaft abutment such as flange 42, and a clamping nut 43 threadedly received on the shaft end, as shown by Fig. 1. Referring to Figs. 1, 3 and 4, valve 36 is recessed annularly adjacent the hub 36, as at 44, the recess being extended radially therefrom, to provide three equally-angularly spaced pockets 45 (Fig. 3). Intermediate the pockets 45 and extending longitudinally through the valve body, are three passages 46 each spaced an equal distance angularly, from the adjacent pockets 45, as clearly appears in Fig. 3.

Valve elements 37 coacting with the opposite block face 33, is similarly rigidly secured upon shaft 40, the hub thereof being keyed to the shaft as at 47, and clamped against shaft flange 48 by a securing nut 49 threaded on the shaft.

Closing the casing bore 11 at the opposite casing ends, are closure plates or casing heads 50 and 51, the head 50 being apertured at 52 for the passage of the shaft 40 therethrough and through a packing gland assembly 53 carried by the head plate, for driven connection with an operating part of the valve gear (not shown) of the associated engine. Casing head 50 cooperates with the adjacent walls of the casing and with the rear face 54 of valve element 36, to define a valve chamber 55 provided to receive live steam under desired pressure, from a steam source (not shown), steam admission to the chamber being afforded by a casing passage open to the chamber at 56. Similarly, the casing head 51 defines with the adjacent casing walls and the rear face 57 of valve 37, a like steam chamber 58, admission of steam thereinto being afforded by a casing passage opening at 59 to the chamber. As shown, the heads 50 and 51 may be removably secured to the casing by suitable stud bolts 60.

According to the present improvements, the valve elements 36 and 37, being of identical form and construction, and each characterized by a symmetrical arrangement of its recesses and passages, are exactly balanced prior to assembly in the valve mechanism. The valve 36 shown in detail, has its face 61 at the open side of the recesses 44—45, machined to provide a true planar surface for coaction with the planar end surface 28 of the valve block 20. The corresponding face 61' of valve 37 is likewise machined for planar coaction with the mating planar face 33 of block 20.

In final assembly, the valve elements 36 and 37 have a distinct and predetermined running clearance with respect to the adjacent surface of the casing bore 11 and to the block end faces 28 and 33. The latter clearance is determined in particular, by the shaft flanges 42 and 48 which with the securing nuts maintain the rotary valves in fixed spaced relation longitudinally of the shaft such that when the rotor assembly is centered longitudinally with respect to the block 20, the valve faces 61 and 61' will have a running clearance relative to the block end faces 28 and 33 respectively, which will, in moderate size engines, be between one and five thousandths inch, preferably of the order of 1½ thousandths of an inch. It is preferred to fit the valve discs in the chest or casing so as to provide a peripheral or radial clearance of say five thousandths inch around each disc. Since, as a preference, the metals of the block, chest, valve discs and shaft have a substantially equal coefficient of expansion, the clearances do not vary greatly under different operating conditions. Power loss in the valve is thus minimized, and sticking becomes impossible.

In the operation of the valve device with the valve rotor substantially centered longitudinally relative to the fixed valve block 20 as intended, it has been found in practice that the rotor is retained in approximately such position, in consequence of pressure balance thereof attained to a material and practical extent, by the substantially equal and opposite pressure reactions upon the disc valves 36 and 37, afforded by the equal steam pressures in the valve chambers 55 and 58. The valve rotor comprising the valve elements 36 and 37 and the shaft 40, this is substantially longitudinally balanced by fluid-pressure during normal valve operation, such as to establish the described operational clearance of each valve with the valve block 20, whereby there is definitely avoided any more than a mimimum frictional engagement between the planar faces 61 and 61' of the rotary valves and the respective coacting planar faces 28 and 33 of the block 20. A further advantage of the present arrangement, providing the described running clearance of the rotary valve elements, is that the clearance maintained by reason of the pressure balance of the valve rotor, facilitates retention of a lubricating oil film between the opposed valve and block surfaces 61—28 and 61'—33.

The foregoing constitute important features of the present invention, as by reason of the mechanical and fluid-pressure balance of the valve rotor and the running clearance of each rotary valve element, ease of valve operation is thereby facilitated to an extent permitting ready reversal of valve rotation while the valve device is subject to full or maximum steam pressure. The running clearance of the rotary valves in particular, precludes face scoring and frictional wear at the coacting faces 61—28 and 61'—33. Thus, the valve rotor according to the present improvements, may be characterized by inherent and permanent operational balance, and by a highly desirable floating relation with respect to the valve faces 28 and 33 of the valve block 20, the latter in particular, serving to prevent valve-sticking at the valve seats and relative to the casing bore.

According to the present example and as illustrated by Fig. 1, the rotary valves 36 and 37 are related such that one in angularly displaced relative to the other by a half-turn, and the shaft 40 is preferably rotated at a one-to-three ratio to the engine crankshaft speed. Thus in the operation of the valve and when the rotary valves assume the positions shown, the passages 46 in rotary valve 36 register with the block passages 26 to establish steam admission from chamber 55 through valve casing passage 16 to the engine cylinder C—1 associated with the latter passage. At this time, the pockets 45 in valve 36, register with the block passages 27 to permit steam exhaust from the opposite cylinder of the engine, through casing passage 17, block passages 27, valve pockets 45 and recess 44, into the block chamber 21—24, for ultimate discharge through passage 25. It will be observed that the pockets and central annular recess of each rotary valve, communicate at all times with the block exhaust chamber 21—24. The operative position of the opposite valve 37 is now exactly reversed, such that it establishes steam admission from chamber 58 through valve passages 46', block passages 31, and casing passage 19 to the engine cylinder C—2 associated with the latter passage, while permitting steam exhaust from the opposite cylinder C—1 as through casing passage 18, block passages 32, valve pockets 45' and recess 44', and block chamber 21—24 to discharge through passage 25. Continued rotation of the valve rotor assembly will produce alternately opposite steam admission and exhaust relative to the engine cylinders, as will be now appreciated.

The presently improved valve assembly fully attains the several objects hereinabove expressed and others now readily apparent, and presents a device of high efficiency and effectiveness in its function to control steam admission and exhaust in steam engines and the like. Although for brevity the improvements are described as applied to a steam valve assembly, it will be understood that they are equally applicable to compressed air motors, or other fluid pressure control purposes. Further, the valve assembly comprises relatively few parts, all of which may be easily and economically manufactured and readily assembled. It is to be noted in particular, that by insetting the valve discs 36 and 37 well within the valve casing, the axial dimension of the assembly is considerably reduced, with resultant reduction not only in mounting space, but in the weight of the valve assembly.

While the present description and drawing illustration relates to but a single, preferred embodiment of the invention, it is to be understood of course, that modifications in the parts and assembly relationship thereof, may be effected without departing from the spirit and full intended scope of the invention, as hereinafter claimed.

I claim as my invention:

1. In a rotary engine valve assembly, a casing or chest providing a plurality of fluid inlet passages and an exhaust passage, and further providing internally of the chest a pair of fixedly spaced, parallel planar valve seats and a defined surface extending adjacently and normal to each of said seats, a pair of valve discs each coacting with one of said seats and formed for peripheral coaction with the adjacent defined normal surface to provide a clearance space between the edge of the disc and said normal surface dimensioned to receive and to retain a sealing film of oil about the periphery of the valve discs, and a one-piece shaft extending into the chest and serving to carry the valve discs, the shaft being provided with valve disc spacing elements thereon, spaced longitudinally of the shaft, the discs being secured angularly and longitudinally to the shaft and axially so spaced on the shaft by said spacing elements, as to provide under all operating conditions, a differential longitudinal spacing of valve discs and of valve seats, wherein the difference of spacing between valve discs and between valve seats is such as will provide a clearance space between each valve and its seat dimensioned to receive and to retain a sealing film of oil for the valve face, and which clearance space will prevent both valve discs sliding simultaneously on both valve seats.

2. A rotary valve of the character described, for controlling steam admission to and exhaust from cylinders of steam engines and the like, comprising a valve casing, a separately formed, one-piece valve member secured in substantially longitudinally centered position within the casing, said member being formed to provide opposite planar end faces constituting valve seats, an exhaust chamber axially therethrough and open to each of said valve seats, and a plurality of passages in each end portion of the member, each passage terminating in a port-opening in the adjacent valve seat and at its opposite end, opening radially to the periphery of the member, said casing having a plurality of steam delivery and exhaust passages extending transversely therein and open to the casing exterior for engine cylinder connection, the opposite end of each casing passage being in communication with the peripherally open ends of certain of the passages in said valve member, a rotary disc valve adjacent each of said valve seats and provided with a planar control face overlying the valve seat, a valve spindle extending into said casing and axially through said valve member, the disc valves being mounted upon said shaft for rotation thereby, each of said disc valves cooperating with a portion of the casing to define a steam chamber adjacent the disc valve, the portion of the casing so coacting with each disc valve including a defined surface surrounding the periphery of the disc valve and uniformly spaced therefrom to form with the disc valve periphery, a clearance space dimensioned to receive and to retain an oil film, an oil film received in said space and filling the same, the film constituting a peripheral seal for the disc valve, said disc-valves being formed to provide passages in each, effective upon valve rotation to establish alternately, steam delivery communication between said steam chambers and certain of the port-openings in the valve seats, and exhaust discharge communication between others of the port-openings in the valve seats and said exhaust chamber in the valve member, abutment elements on said spindle engaging said disc valves and serving to determine the relative axial spacing of said valve discs such that the distance between the planar faces of the latter is greater than the distance between the planar end faces of the valve member, to an extent such that with the spindle-carried disc valves centered longitudinally relative to the valve member, there is provided between the planar face of each disc valve and the adjacent planar face of the valve member, a space dimensioned to receive and to retain a sealing film of oil, and means for admitting steam under pressure to said steam chambers, the steam pressure in the chambers reacting substantially equally and oppositely on the disc valves, to balance the disc valves and spindle endwise thereof in substantially a centered position relative to the stationary valve member.

EMERY L. CAMFIELD.